April 11, 1972  S. M. CSICSERY ET AL  3,655,798
CATALYTIC ISOMERIZATION PROCESS
Filed March 19, 1970

INVENTORS
SIGMUND M. CSICSERY
BERNARD F. MULASKEY
BY Roy H. Davis
C. J. Tonkin
ATTORNEYS

United States Patent Office 3,655,798
Patented Apr. 11, 1972

3,655,798
CATALYTIC ISOMERIZATION PROCESS
Sigmund M. Csicsery, Lafayette, and Bernard F. Mulaskey, Fairfax, Calif., assignors to Chevron Research Company, San Francisco, Calif.
Filed Mar. 19, 1970, Ser. No. 21,152
Int. Cl. C07c 5/24, 15/02
U.S. Cl. 260—668 A
10 Claims

ABSTRACT OF THE DISCLOSURE

A catalytic isomerization process which comprises contacting a hydrocarbon feedstock at catalytic isomerization conditions with a catalyst comprising a synthetic interstratified smectite-illite clay-type aluminosilicate component and at least one additional component comprising a metal.

INTRODUCTION

Figure 1:
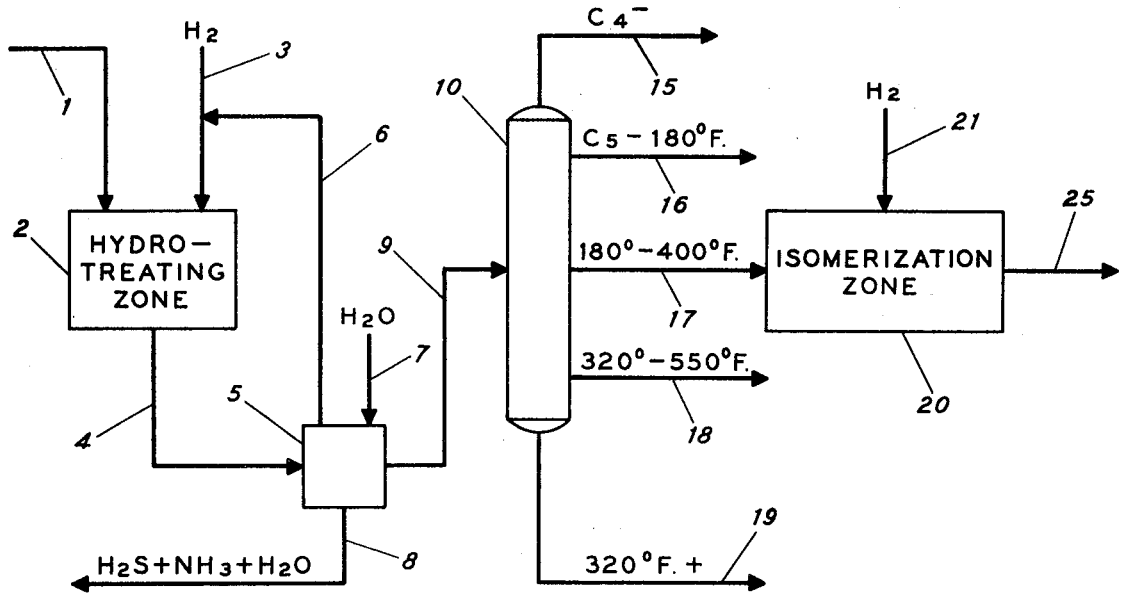

This invention relates to catalytic isomerization of hydrocarbons, including: (a) substituted and unsubstituted aromatics; (b) olefins; and (c) paraffins, including cycloparaffins, isoparaffins and normal paraffins, particularly normal paraffins contained in petroleum distillates, for example lube oils, jet fuels and naphthas. Catalytic isomerization of aromatics, olefins and cycloparaffins is primarily useful to convert such compounds in relatively pure form to other compounds that are more valuable for chemical uses. Catalytic isomerization of normal paraffins is primarily useful to convert such compounds contained in petroleum distilllates to isoparaffins, for example to improve pour point of lube oils, to improve freeze point of jet fuels, and to improve octane rating of naphthas.

PRIOR ART PROCESSES (A) General

It is known that substituted and unsubstituted aromatics, olefins and cycloparaffins can be subjected to catalytic isomerization, including hydroisomerization and dehydroisomerization, to produce isomerized products particularly products desired for use as chemicals or in the manufacture of chemicals. It also is known that petroleum distillates can be subjected to catalytic isomerization, particularly hydroisomerization, to upgrade them for various purposes, for example to improve pour point of lube oils, to improve freeze point of jet fuels and to improve octane rating of naphthas. However, certain problems exist with respect to the prior art catalysts and processes, as discussed below.

(B) Catalytic isomerization of aromatics, olefins and cycloparaffins, to produce compounds for use as chemicals or in the manufacture of chemicals Alkylaromatics, for example orthooxylene, can be isomerized to produce more valuable products, for example paraxylene. However, in conventional catalytic isomerization processes undesirably high amounts of undesirable cracked products and undesirable trimethylbenzenes and toluene are produced. Similarly, in catalytically isomerizing ethylbenzene to xylenes in conventional processes, undesirably high amounts of undesirable cracked products and undesirable trimethylbenzenes and toluene are produced. Desirable improvements in such processes would be a reduction in the amounts of cracked products and an increase in the isomerization/disproportionation ratios.

Catalytic hydrogenation of benzene to produce cyclohexane can be accompanied by catalytic hydroisomerization of a portion of the feedstock to methylcyclopentane. While the catalytic hydroisomerization in this process is undesirable, in that it reduces the production of cyclohexane, it is a measure of the catalytic isomerization activity of the catalyst used in the process. In processes employing the reverse reaction, methylcyclopentane can be catalytically dehydroisomerized to produce benzene. There is room in such processes for improvements, for example reduction in the amount of undesirable cracked products.

Normal butylbenzene can be catalytically isomerized to isobutylbenzene and secondary butylbenzene by conventional processes, with, however, accompanying undesirably large amounts of dehydrogenation and fragmentation. Desirable improvements in such processes, therefore, would be reductions in the amounts of dehydrogenation and fragmentation.

Olefins can be catalytically isomerized by conventional processes, to shift the location of the double bond. There also is room for improvemens in such processes.

(C) Catalytic isomerization of relatively pure normal paraffin compounds, for example n-heptane and decane It is known that relatively pure normal paraffins can be catalytically isomerized to isoparaffins, by conventional processes. However, the isomerization is accompanied by an undesirable amount of cracking, and by an irreversible sulfur sensitivity of the catalyst used. There is room for improvement in these processes, at least in these respects.

(D) Catalytic isomerization of petroleum distillates to improve pour point of lube oils and freeze point of jet fuels Normal paraffins, which adversely affect lube oil pour point and jet fuel freeze point, can be physically removed from a petroleum distillate, for example by solvent treating, or can be isomerized, for example by catalytic isomerization, to isoparaffins, which has a less deleterious effect on pour point and freeze point. The solvent treating method is known as solvent dewaxing and the catalytic isomerization method is known as catalytic dewaxing.

A known solvent dewaxing process is one wherein a solvent such as a mixture of methylethylketone and benzene is added to the waxy hydrocarbon oil. The mixture of methylethylketone and benzene preferentially dissolves the nonwaxy hydrocarbons, thereby permitting separation of the nonwaxy hydrocarbons, from the waxy hydrocarbons by cooling and filtration. A known catalytic dewaxing process is one wherein the waxy components, which are primarily long-chain paraffins, are converted in the presence of a catalyst comprising a hydrogenating component and either silica-alumina or fluorided alumina, primarily by isomerization and cracking reactions, to smaller-chain and/or branch-chain paraffins. Catalytic dewaxing processes have an advantage over solvent dewaxing processes in that separation of waxy and nonwaxy components is not required. However, the prior art catalytic dewaxing processes have at least two important disadvantages: (a) the isomerization catalyst support has substantial cracking activity, and undesirably cracks some of the potentiallly valuable hydrocarbon feedstock to low-value light products such as hydrocarbon gases; and (b) the isomerization catalyst is sulfur-sensitive, and is irreversibly poisoned by sulfur.

(E) Catalytic isomerization to improve octane rating of naphthas

Normal paraffins in naphtha boiling range petroleum distillates also can be catalytically isomerized to convert them to isoparaffins, which have a higher octane rating However, as in the case of catalytic dewaxing of lube oil and jet fuel stocks, the prior art catalytic isomerization processes for increasing octane rating of naphthas suffer from the disadvantages that: (a) the isomerization catalyst causes undesirable cracking and consequent production of undesired light gases; and (b) the isomerization catalyst is irreversibly poisoned by sulfur.

PRIOR ART ISOMERIZATION PROCESSES, NEED FOR IMPROVEMENTS THEREIN, AND POSSIBLE APPROACHES TO ACCOMPLISH SAID IMPROVEMENTS

In seeking ways to improve prior art isomerization processes, particularly to overcome the tendencies of the catalysts used therein to accomplish undesired cracking and to become irreversibly poisoned by sulfur, different types of materials might be considered as alternates to such conventional isomerization components of prior art catalysts as silica-alumina and fluorided alumina.

One class of materials that could be considered, in searching for an isomerization component of an isomerization catalyst in lieu of a silica-alumina or fluorided alumina isomerization component, comprises the clays, or phyllosilicates, which are clay-type aluminosilicates. These materials are crystalline in form and, contrary to the amorphous silica-alumina gels and alumina gels, and contrary to the amorphous silica-alumina gels and alumina gels, and contrary to the crystalline zeolitic molecular sieves, have pores elongated in two directions. Some of these materials have the ability to expand upon the addition of a liquid. Some of them have cracking activity, or can be activated, as by acid treatment, to impart cracking activity to them. Natural clays have differing properties and combinations of properties, for example:

|   | Expandable | Cracking activity, or can be activated |
|---|---|---|
| A | Allophane | ✓ |
| B | Kaolin | ✓ |
| C | Smectite | ✓ |
| D | Illite | ✓ |
| E | Chlorite | |
| F | Vermiculite | ✓ |
| G | Attapulgas | |

Natural clays can be complex combinations from more than one category in the above list. For example, they can comprise an expandable component and a non-expandable component, a component having relatively high cracking activity and one having relatively low cracking activity, etc.

Synthetic clays also can be produced which are analogous to natural clays in the above categories, and synthetic clays also can be complex combinations from more than one category in the above list.

It is impossible to predict with any reasonable accuracy which natural or synthetic clays in the many possible categories and combinations of categories will be operable as a component of an isomerization catalyst to produce various possible desired results. If the isomerization result desired is, for example, the conversion of alkylaromatics to more valuable alkylaromatics with minimum cracking, or the conversion of normal paraffins to isoparaffins with minimum cracking, and if one skilled in the art is seeking an isomerization component other than an amorphous silica-alumina gel or fluorided amorphous alumina gel, one skilled in the art reasonably could conclude that he should select a catalyst not containing a crystalline zeoitic molecular sieve cracking component, which not only has high cracking activity but tends to promote disproportionation in certain cases. However, he is left with an extensive array of other choices, including treated and untreated natural clays in many categories, treated and untreated synthetic clays in many categories, etc. Assuming that one skilled in the art not only would reject amorphous silica-alumina, fluorided amorphous alumina, and crystalline zeolitic molecular sieves as the isomerization component in the desired catalyst, and would choose to try to make a catalyst containing a natural or synthetic clay that would convert normal paraffins to isoparaffins with high selectivity, he would find that some of the clays have isomerization activity that is far too low to be acceptable. He also would find that isomerization catalysts that contained some clays that might have acceptable isomerization activities would have concomitant excessive cracking activities, in some or many cases accompanied by high fouling rates. At the same time, he would be seeking a material not subject to the irreversible sulfur-poisoning problem of the conventional prior art catalysts such as the ones containing silica-alumina gel.

In view of the foregoing, it would be desirable if an isomerization catalyst were available that contained a clay-type cracking component, and that had high selectivity for isomerizing alkylaromatics, olefins, cycloparaffins, with minimum cracking. It would also be desirable for such a catalyst to have a high stability, that is, a low fouling rate in isomerization service. It further would be desirable if such a catalyst had either a high degree of tolerance for organic sulfur compounds in the feedstock, or if it was not irreversibly poisoned by organic sulfur compounds in the feedstock.

OBJECTS

Accordingly, objects of the present invention include providing an improved isomerization catalyst containing a clay-type cracking component that has, compared with similar prior art catalysts:

(1) high isomerization activity;
(2) improved isomerization selectivity;
(3) high nitrogen tolerance;
(4) high isomerization stability;
(5) resistance to irreversible sulfur poisoning.

Further objects of the present invention include provision of an isomerization process using said improved catalyst, that is capable of improving processes for catalytic isomerization of alkylaromatics, olefins, cycloparaffins, isoparaffins and normal paraffins, and that in the case of treatment of petroleum distillates is capable of improving the pour point of lube oils, the freeze points of jet fuels, and the octane rating of naphthas.

The present invention will best be understood, and further objects and advantages thereof will be apparent, from the following description when read in connection with the accompanying drawing.

DRAWING

The drawing is a diagrammatic illustration of apparatus and flow paths suitable for carrying out the process of the present invention, wherein the catalyst of the present invention is used on a once-through basis to isomerize a hydrocarbon feedstock to produce more valuable products.

STATEMENT OF INVENTION

In accordance with the present invention, it has been found that (a) to accomplish catalytic isomerization, including catalytic isomerization of alkylaromatics, olefins, cycloparaffins, isoparaffins and normal paraffins, including normal paraffins in petroleum distillates such as lube oils, jet fuels and naphthas, with a hydrocracking catalyst containing a clay-type cracking component, with (b) high isomerization selectivity, minimal cracking, and minimal irreversible sulfur poisoning of the catalyst, the catalyst used must:

(1) Contain a crystalline clay isomerization component of a very specific type, namely one which (a) is a synthetic crystalline aluminosilicate, and
(b) is in the form of interstratified materials, or materials in mixed layers, said materials being clays from two different clay categories, namely the smectite and illite categories; and (2) Contain at least one additional component, preferably a hydrogenating component, comprising a metal, preferably a Group VIII metal.

It is preferred that said aluminosilicate component:

(a) have an alkali metal cation content in the range 0–0.5 wt. percent, on an anhydrous interstratified crystalline component basis, and,
(b) have a content of fluorine, in combined form, in the range 0–3 wt. percent, preferably 0–2.5 wt. percent, and more preferably 0.5–2.5 wt. percent, on an anhydrous interstratified crystalline component basis.

Said crystalline clay isomerization component containing mixed layers of clays from the smectite and illite categories may be, for example, prior to drying and calcining the catalyst in which it is contained, a randomly interstratified synthetic montmorillonite-mica mineral of the type described in Granquist U.S. Pat. 3,252,757. The synthetic mineral described in that patent has the empirical formula $$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\tfrac{1}{2}O^{--}$ and mixtures thereof, and is internal in the lattice, and
$x$ is from 2.0 to 3.5 at 50% relative humidity, said mineral being characterized by a  spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations. The equivalent of an exchangeable cation, A, in said mineral may be chosen from the group consisting of $H^+$, $NH_4^+$, $Li^+$, $K^+$, $\tfrac{1}{2}Ca^{++}$, $\tfrac{1}{2}Mg^{++}$, $\tfrac{1}{2}Sr^{++}$, and $\tfrac{1}{2}Ba^{++}$, and mixtures thereof. Said synthetic mineral is known from U.S. Pat. 3,252,889 to have application in the dried and calcined form as a component of a catalytic cracking catalyst. By "dried and calcined form" is meant the mineral form resulting from drying and calcining the catalyst in which it is contained, which form may be different from the form of the mineral defined by the foregoing formula.

When the catalyst used in the process of the present invention comprises a matrix, as discussed below, said crystalline isomerization component may be substantially in the ammonium or hydrogen form and may be substantially free of any catalytic loading metal or metals.

In particular embodiments, the catalyst used in the process of the present invention further comprises a matrix comprising an amorphous gel, for example silica gel or alumina gel, and said hydrogenating component, and said crystalline clay component is in particulate form and is dispersed through said matrix. Said crystalline component may be substantially in the ammonium or hydrogen form and may be substantially free of any catalytic loading metal or metals.

A particular embodiment of the catalyst used in the process of the present invention is a catalyst comprising:

(a) a gel matrix comprising a gel, which may comprise silica gel or alumina gel, and at least one hydrogenating component selected from the group consisting of Group VIII metals and compounds of Group VIII metals, and
(b) an interstratified smectite-illite aluminosilicate component in particulate form;

said interstratified aluminosilicate component being dispersed through said gel matrix.

Preferably, the catalyst used in the process of the present invention will be further characterized by an average pore diameter below 100 angstroms and a surface area above 200 square meters per gram, when it includes a gel matrix.

The catalyst used in the process of the present invention, whether or not it includes a gel matrix, comprises an additional component comprising a metal, preferably selected from the Group VIII metals and the metals Ag, Cu, Sn, Ti, Zr, Th, Hf, Cr, Mo, W, V, Mn, Tc, Re, alkaline earth metals Mg, Ca, Sr and Ba, rare earth metals having atomic numbers 57–71, and compounds of said metals. Preferably the catalyst will comprise a hydrogenating component selected from the Group VIII metals and compounds thereof. Although the catalyst used in the process of the present invention is not irreversibly poisoned by sulfur, it is strongly preferred that said additional component be in the form of the metal or some compound other than a sulfide. When said catalyst includes a gel matrix, said additional component may be present in said matrix in an amount of 0.1 to 10 weight percent, preferably 0.5 to 9 weight percent, of said matrix, calculated as metal.

Said Group VIII component may be, for example, iron, nickel, cobalt, platinum or palladium, in the form of the metal or oxide, or any combination thereof. When said catalyst does not include a gel matrix, said Group VIII component when used in said catalyst may be present therein in an amount of 0.1 to 15 weight percent, calculated as metal and based on said interstratified aluminosilicate component. When said catalyst includes a gel matrix, said Group VIII component when used in said catalyst may be present therein in an amount of 0.1 to 15 weight percent, preferably 0.1 to 10 weight percent, calculated as metal and based on said matrix. When said Group VIII component is iron, nickel, cobalt, or compounds theerof, preferably it will be present in said catalyst comprising a gel matrix in an amount of at least 5 weight percent, calculated as metal and based on said matrix. Platinum or palladium or compounds thereof when used in said catalyst will be present in lesser amounts than iron, nickel, cobalt, or compounds thereof.

When said catalyst does not include a gel matrix, said Group VI component when used in said catalyst may be present therein in an amount of 0.1 to 20 weight percent, preferably 0.5 to 10 weight percent, calculated as metal and based on said interstratified aluminosilicate component. When said catalyst includes a gel matrix, said Group VI component when used in said catalyst may be present therein in an amount of 0.1 to 25 weight percent, preferably 0.5 to 20 weight percent, calculated as metal and based on said matrix.

When rhenium or a compound thereof is used in said catalyst, it may be present in an amount equivalent to the amounts indicated above for Group VIII metals and compounds thereof.

Said catalyst advantageously may contain tin or a compound thereof, particularly when it also contains nickel or a compound thereof, regardless of whether said catalyst includes a gel matrix. The tin or compound thereof may be present in said catalyst in an amount of 0.5 to 30 weight percent, preferably 2 to 15 weight percent, based on the total catalyst and calculated as metal, when said catalyst includes a gel matrix. When said catalyst does not include a gel matrix, the tin or compound thereof may be present in an amount of 0.2 to 15 weight percent, based on the total catalyst and calculated as metal.

Said interstratified aluminosilicate is present in said catalyst in an amount of 5 to 99 weight percent thereof.

Another particular embodiment of the catalyst used in the process of the present invention is a catalyst comprising:

(A) A gel matrix comprising:

(a) 5 to 85 weight percent, preferably 15 to 70 weight percent, silica, or 10 to 94 weight percent, preferably 30 to 85 weight percent, alumina, (b) at least one Group VIII component in the form of metal or oxide or any combination thereof, in an amount of 0.1 to 15 weight percent, preferably 0.1 to 10 weight percent, of said matrix, calculated as metal; and (B) An interstratified smectite-illite aluminosilicate (which may be substantially in the ammonium or hydrogen form, substantially free of any catalytic loading metal or metals), said interstratified aluminosilicate further being in particulate form and being dispersed through said matrix;

Another particular embodiment of the catalyst used in the process of the present invention is a catalyst comprising:

(A) A porous xerogel comprising:

(a) 5 to 85 weight percent, preferably 15 to 70 weight percent, silica, or 10 to 94 weight percent, preferably 30 to 85 weight percent, alumina, (b) platinum or palladium, in the form of metal or oxide or any combination thereof, in an amount of 0.01 to 5 weight percent, preferably 0.1 to 2 weight percent, of said xerogel, calculated as metal, (c) iron, in the form of metal or oxide or any combination thereof, in an amount of 0.1 to 15 weight percent, preferably 0.1 to 10 weight percent, of said xerogel, calculated as metal, (B) An interstratified smectite-illite aluminosilicate, in an amount of 5 to 99 weight percent of said catalyst, said interstratified aluminosilicate preferably being substantially in the ammonium or hydrogen form, and preferably being substantially free of any catalytic loading metal or metals, said interstratified aluminosilicate further being in the form of particles, said particles being dispersed through said xerogel; said catalyst having an average pore diameter below 100 angstroms and a surface area above 200 square meters per gram.

Still further in accordance with the present invention, there is provided an isomerization process which comprises contacting a hydrocarbon distillate feed containing normal paraffins and isoparaffins in a ratio of normal paraffins to isoparaffins that differs from the equilibrium ratio, at the isomerization conditions used, for example that exceeds the equilibrium ratio, in a reaction zone with hydrogen and the catalyst described above, at isomerization conditions, and recovering isomerized products from said reaction zone. The hydrocarbon feed may contain a substantial amount of organic nitrogen and sulfur, because the catalyst used in the process of the present invention is tolerant of organic nitrogen as well as of ammonia, and because any deleterious effect of sulfur is reversible, contrary to many conventional isomerization catalysts; however, a low nitrogen and sulfur content of the feed is preferred.

The reference to an interstratified aluminosilicate component or a molecular sieve component "substantially free of any catalytic loading metal or metals" means that the component in question contains less than 0.1 weight percent noble metals, and less than 0.5 weight percent of total catalytic metal or metals, based on that component. If desired, the interstratified aluminosilicate component may be loaded with 0.1 to 10 weight percent, based on said interstratified aluminosilicate component, of a polyvalent non-catalytic ion selected from Mn, Ti, Zr, Hf, Th, rare earths having atomic numbers 57–71, and alkaline earths Mg, Ca, Sr and Ba, while still keeping said component so loaded substantially free of any catalytic loading metal or metals.

It will be noted that the weight ratio of catalytic metal in the matrix portion of the catalyst to catalytic metal in the interstratified aluminosilicate portion of the catalyst is high, in the catalyst embodiments which include a gel matrix in which is dispersed an interstratified aluminosilicate substantially free of any catalytic loading metal or metals.

In addition to the 0–3 wt. percent fluorine content of the crystalline clay cracking component of the catalyst used in the process of the present invention, other catalyst components present also may contain fluorine, in combined form, in an amount of 0–5 wt. percent of said other components. For example, when the catalyst comprises a gel matrix, said matrix may contain 0–5 wt. percent combined fluorine. The fluorine may be incorporated into the catalyst in any convenient manner that will result in a substantially uniform distribution of combined fluorine on or through the other catalyst components. A preferred manner of incorporating the fluorine in the catalyst is by the addition of a soluble fluoride compound, for example sodium fluoride, ammonium fluoride, ammonium bifluoride or hydrofluoric acid. The fluoride compound may be combined with the other catalyst components at any of various stages of catalyst preparation. When the catalyst includes a matrix comprising a siliceous gel, the fluoride compound may be formed with the matrix as a component thereof.

HYDROCARBON FEEDSTOCKS

The hydrocarbon feedstocks which may be supplied to the isomerization zone in the process of the present invention vary over a wide range, and include feedstocks consisting of or containing substantial amounts of at least one compound selected from aromatic, olefin, cycloparaffin and normal paraffin compounds. Such compounds include orthoxylene, ethylbenzene, methylcyclopentane, hexenes, hexane, decane, and other long-chain normal paraffins. Said feedstocks include petroleum distillates containing normal paraffins in an amount providing a ratio of normal paraffins to isoparaffins that is above the equilibrium ratio. Suitable hydrocarbon distillate feedstocks include lube oils and jet fuels, boiling above 300° F., which are amenable to catalytic dewaxing, and naphthas, boiling below 400° F., amenable to catalytic isomerization. Said suitable hydrocarbon distillate feedstocks may be obtained from thermal or catalytic cracking of various stocks, including those obtained from petroleum, gilsonite, shale and coal tar. The hydrocarbon distillate feedstocks need not be subjected to a prior hydrofining treatment before being isomerized in the process of the present invention; however, it is preferred that feedstocks containing more than about 10 parts per million organic sulfur first be hydrofined to reduce the sulfur level to below 10 parts per million.

If hydrofining of hydrocarbon distillate feedstocks is necessary or considered desirable, it may be accomplished at conventional conditions, for example a temperature of from 500° to 850° F., a pressure within the range of from 400 to 4000 p.s.i.g., a liquid hourly space velocity (LHSV) of from 0.2 to 10 volumes of feed/volume of catalyst/hour (v./v./hr.) and a hydrogen flow rate of above about 500 s.c.f./bbl. of feed. A conventional hydrofining catalyst, such as nickel and molybdenum on alumina, may be used.

When isomerizing a high-boiling hydrocarbon distillate feedstock in accordance with the process of the present invention, particularly a lubricating oil feedstock which boils above 750° F., it may be particularly desirable first to hydrofine the feedstock to convert organic nitrogen compounds and organic sulfur compounds therein to ammonia and hydrogen sulfide. The ammonia and hydrogen sulfide can then be removed from the reaction zone effluent, and the substantially nitrogen- and sulfur-free product may be isomerized in accordance with the process of the present invention. As a further modification, the nitrogen- and sulfur-free feed from the hydrofining zone can be hydrogenated with an active hydrogenation catalyst in the presence of hydrogen at aromatic hydrogenation conditions, for example a temperature of from 200° to 650° F. and a pressure in the range of, e.g., 1000 to 5000 p.s.i.g., to substantially convert aromatics to naphthenic products before catalytic dewaxing.

Hydrocarbon distillate feedstocks used in the process of the present invention desirably contain at least 5 weight percent, more preferably at least 10 weight percent, and most preferably at least 20 percent by weight of waxy hydrocarbons. "Waxy hydrocarbons" mean any normally solid paraffinic hydrocarbons, and include paraffin wax and microcrystalline wax. Preferably the feed contains at least 5 weight percent of $C_{15}+$ normal paraffins. It has been realized that the $C_{15}+$ normal paraffins are the most troublesome waxy components; thus lowering the $C_{15}+$ normal paraffin concentration produces significant changes in the freezing point and/or pour point.

CATALYST COMPRISING AN INTERSTRATIFIED ALUMINOSILICATE COMPONENT, AND PREPARATION THEREOF

(A) General

The interstratified aluminosilicate used in preparing the isomerization catalyst may be any synthetic catalytically active interstratified smectite-illite aluminosilicate, although the synthetic interstratified aluminosilicate of Granquist U.S. Pat. 3,252,757 is preferred. The sodium content of the interstratified aluminosilicate should be below 0.5 weight percent, calculated as metal, on an anhydrous interstratified aluminosilicate basis.

(B) Method of preparation when catalyst does not include a gel matrix

When the catalyst does not include a matrix comprising a siliceous gel, the hydrogenating component or components may be added to the interstratified aluminosilicate in any convenient manner, as by impregnation, adsorption or ion exchange, using suitable hydrogenating component precursor compounds, for example nitrates.

(C) Method of combining interstratified aluminosilicate component with matrix when catalyst includes a gel matrix When the catalyst includes a gel matrix, the interstratified aluminosilicate component may be dispersed therein by cogelation of the matrix around said interstratified aluminosilicate component in a conventional manner.

The desired hydrogenating componet or components may be included in the matrix during preparation thereof, in the form of suitable precursor compounds, for example chlorides.

The interstratified aluminosilicate component, substantially in the ammonium or hydrogen form, may be maintained substantially free of any catalytic loading metal or metals, in accordance with a preferred embodiment of the present invention, by dispersing it in a slurry of the precursors of the gel matrix at a pH of 5 or above. When a sodium form of interstratified aluminosilicate is a starting material, it may be converted to the ammonium or hydrogen form by ion exchange prior to being combined with the other catalyst components. Alternatively, it may be combined with the other catalyst components and then converted to the ammonium or hydrogen form by ion exchange. Whether or not said aluminosilicate is first converted to the ammonium or hydrogen form, said other components may be prepared in gel form and washed to reduce the sodium content thereof below 1 wt. percent, preferably below 0.5 wt. percent, before said aluminosilicate is combined therewith. In any case, the interstratified aluminosilicate component should not be combined with the precursors of the other catalyst components at a pH below 5, if catalytic metal loading is to be avoided.

(D) Drying and activation

The catalyst following preparation in the aforesaid manner is dried in a conventional manner, and then desirably is activated in an oxygen-containing gas stream for 0.25 to 48 hours at 900° to 1600° F., preferably 0.25 to 48 hours at 900° to 1300° F. The oxygen-containing gas stream, which may be air, preferably is dry as practicable. The improved results obtainable by activation in the indicated manner are optimized as the gas stream becomes extremely dry; although for most practical purposes the gas stream need be only as dry as ambient air, greater dryness is preferred. Those skilled in the art will be aware of various methods for drying the gas stream to any desired extent.

(E) Sulfiding

The finished catalyst should not be sulfide prior to use. Sulfur tends to decrease the isomerization activity and selectivity of the catalyst, although in a reversible manner.

OPERATING CONDITIONS

The isomerization zone containing the catalyst of the present invention is operated at a temperature in the range 300° to 950° F., preferably 400° to 800° F., a pressure in the range 0 to 3000 p.s.i.g., preferably 15 to 15 p.s.i.g., more preferably 15 to 1000 p.s.i.g., a liquid hourly space velocity in the range 0.5 to 20.0, preferably 1 to 10, and more preferably 2 to 10. The total hydrogen supply rate (makeup and recycle hydrogen) to said zone is 200 to 20,000 s.c.f., preferably 2000 to 20,000 s.c.f. of hydrogen per barrel of hydrocarbon feedstock.

PROCESS OPERATION WITH REFERENCE TO DRAWING

Referring now to FIG. 1 of the drawing, in accordance with one embodiment of the present invention, a hydrocarbon distillate feedstock having a substantial normal paraffin content, which in this case may boil from $C_5$ to 700° F. and which may contain a substantial amount of organic sulfur and organic nitrogen compounds, is passed through line 1 into hydrofining zone 2, which contains a conventional hydrofining catalyst. The feedstock is hydrofined in zone 2 at hydrofining conditions previously described, in the presence of hydrogen supplied through line 3. Under these conditions, the feedstock is substantially desulfurized and denitrified, with some hydrocracking. The effluent from zone 2 is passed through line 4 to separation zone 5, from which hydrogen separated from the treated feedstock is recycled through line 6 to zone 2. In zone 5, water entering through line 7 is used to scrub hydrogen sulfide, ammonia and other contaminants from the incoming hydrocarbon stream, and the hydrogen sulfide, ammonia, water and other contaminants are withdrawn from zone 5 through line 8. From zone 5, the scrubbed, hydrofined materials are passed through line 9 to distillation column 10, where they are separated into fractions, including a $C_4-$ fraction which is withdrawn through line 15, a $C_5$-180° F. fraction which is withdrawn through line 16, a 180°–400° F. fraction which is withdrawn through line 17, a 320°–550° F. fraction which is withdrawn through line 18, and a 320° F.+ fraction which is withdrawn through line 19. The $C_5$-180° F. fraction withdrawn through line 16 is a light gasoline blending stock. The 180°–400° F. fraction withdrawn through line 17 is a heavy gasoline blending stock or catalytic reforming feedstock. The fraction in line 17 is catalytically isomerized in isomerization zone 20, which contains the catalyst used in the process of the present invention, at isomerization conditions previously described, in the presence of hydrogen supplied to zone 20 through line 21.

An isomerized product of improved octane rating is withdrawn from zone 20 through line 25. The 320°–550° F. fraction withdrawn through line 18 is a jet fuel blend stock. The 320° F.+ fraction withdrawn through line 19 is a lube oil blend stock.

Figure 2:
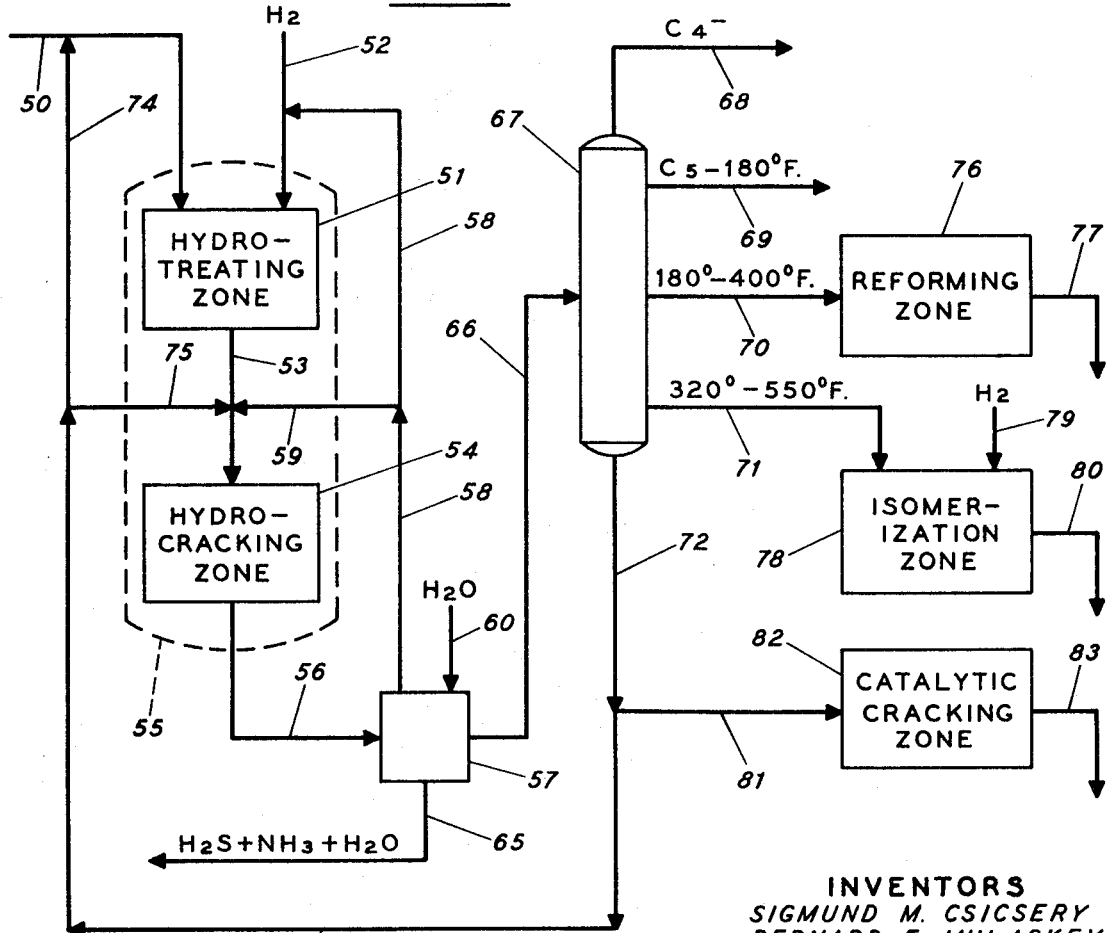

Referring now to FIG. 2, a hydrocarbon distillate feedstock which in this case may boil above 400° F. and which may contain substantial amounts of organic nitrogen compounds, is passed through line 50 to hydrofining zone 51, containing a conventional hydrofining catalyst. The feedstock is hydrofined in zone 51 at conditions previously described in the presence of hydrogen supplied through line 52. The effluent from zone 51 may be passed through line 53 into hydrocracking zone 54, where it may be hydrocracked under conventional hydrocracking conditions, in the presence of a conventional hydrocracking catalyst. The hydrocracking catalyst in zone 54 may comprise a crystalline zeolitic molecular sieve cracking component or a silica-alumina gel cracking component. The effluent from zone 51 may be passed through line 53 into zone 54 without intervening impurity removal, particularly when the hydrocracking catalyst in zone 54 contains a molecular sieve component. Alternatively, interstage removal of ammonia and other impurities may be accomplished between zones 51 and 54. Zones 51 and 54 may be located in separate reactor shells, which may be operated at different pressures. Alternatively, zones 51 and 54 may be separate catalyst beds located in a single pressure shell 55, and the effluent from zone 51 may be passed to zone 54 without intervening pressure letdown, condensation or impurity removal, particularly in the case where zone 54 contains a conventional catalyst comprising a crystalline zeolitic molecular sieve component. The effluent from zone 54 is passed through line 56 to separation zone 57, from which hydrogen is recycled through line 58 to hydrofining zone 51. All or a portion of the recycled hydrogen may be passed through line 59 to hydrocracking zone 54, if desired. In separation zone 57, water entering through line 60 is used to scrub hydrogen sulfide, ammonia and other contaminants from the incoming hydrocarbon stream, if these contaminants previously have not been removed between zones 51 and 54, and the ammonia, water and other contaminants are withdrawn from zone 57 through line 65. The effluent from zone 57 is passed through line 66 to distillation column 67, where it is separated into fractions, including a C₄− fraction which is withdrawn through line 68, a C₅-180° F. fraction which is withdrawn through line 69, a 180°–400° F. fraction which is withdrawn through line 70, a 320°–550° F. fraction which is withdrawn through line 71, and a 320° F.+ fraction which is withdrawn through line 72. The fraction withdrawn through line 72 may be recycled through lines 73 and 74 to hydrofining zone 51, and this is a preferred manner of operation. All or a portion of the fraction in line 73 may be recycled to hydrocracking zone 54 through line 75, if desired. The C₅-180° F. fraction withdrawn through line 69 is a light gasoline. The 180°–400° F. fraction withdrawn through line 70 is a catalytic reforming feedstock, which may be catalytically reformed in reforming zone 76, from which a catalytic reformate may be withdrawn through line 77. The 320°–550° F. fraction withdrawn through line 71 is a jet fuel. The fraction in line 71 is catalytically isomerized in isomerization zone 78, which contains the catalyst used in the process of the present invention, at isomerization conditions previously described, in the presence of hydrogen supplied to zone 78 through line 79. An isomerized product of reduced freeze point is withdrawn from zone 78 through line 80. All or a portion of the 320° F.+ fraction withdrawn through line 72 may be passed through line 81 to catalytic cracking zone 82, where it may be catalytically cracked under conventional catalytic cracking conditions in the presence of a conventional catalytic craking catalyst to produe valuable fuel products, which may be withdrawn from zone 82 through line 83.

EXAMPLES

The following examples are given for the purpose of further illustrating the process of the present invention, including the catalyst used in said process. The examples are not intended to limit the scope of the present invention.

Example 1

A catalyst consisting of alumina and 1.2 weight percent platinum (Catalyst A, not a catalyst used in the process of the present invention) was prepared by impregnation.

Example 2

A catalyst consisting of a physical mixture of practicles of Catalyst A and particles of an interstratified synthetic crystalline aluminosilicate component (Catalyst B, a catalyst used in the process of the present invention) was prepared by physically mixing said particles of Catalyst A with said interstratified aluminosilicate component in a 1:1 volume ratio.

Example 3

Portions of Catalysts A and B of Examples 1 and 2, respectively, were separately used to isomerize separate portions of a normal butylbenzene feedstock, at 750° F. in a He:H₂ mixture, at an initial hydrogen partial pressure of 0.06 atm. The isomerization results are as follows:

| | Catalyst | |
|---|---|---|
| | A | B |
| Isomerization to isobutylbenzene and sec-butylbenzene, mol percent of feed | 0.2 | 0.7 |
| Dehydrogenation | 4.3 | 1.7 |
| Fragmentation | 15.9 | 6.1 |

From this example it may be seen that Catalyst B resulted in a higher level of isomerization to isobutylbenzene and secbutylbenzene, and substantially lower amounts of undesirable dehydrogenation and fragmentation, than did Catalyst A.

Example 4

Additional portions of Catalysts A and B of Examples 1 and 2, respectively, were separately used to dehydroisomerize separate portions of a methylcyclopentane feedstock, at 750° F. in a He:H₂ mixture, at an initial hydrogen partial pressure of 0.06 atm. The isomerization results were as follows:

| | Catalyst | |
|---|---|---|
| | A | G |
| Isomerization to benzene, wt. percent of conversion | 33 | 70 |
| Cracking, wt. percent of conversion | 33 | 18 |
| Ring opening, wt. percent of conversion | 34 | 12 |

From this example it may be seen that Catalyst B resulted in a higher level of dehydroisomerization of methylcyclopentane to benzene, and substantially lower cracking and ring opening, than did Catalyst A.

Example 5

Additional portions of Catalysts A and B of Examples 1 and 2, respectively, were separately used to isomerize separate portions of a normal heptane feedstock, at 800° F. in a He:H₂ mixture, at an initial hydrogen pressure of 0.06 atm. The isomerization results were as follows:

| | Catalyst | |
|---|---|---|
| | A | B |
| Cracking, wt. percent of conversion | 34 | 22 |
| Isomerization, wt. percent of conversion | 12 | 11 |

From this example it may be seen that substantially less undersirable cracking took place with Catalyst B than with Catalyst A.

Example 6

A catalyst consisting of iron, palladium, and an interstratified aluminosilicate (Catalyst C, a catalyst for use in the process of the present invention) was prepared in the following manner.

These starting materials were used:

(1) 500 grams of a synthetic interstratified smectite-illite synthetic crystalline aluminosilicate material as described in Granquist U.S. Pat. 3,252,757;

(2) 1250 ml. of an aqueous solution containing 7.21 grams of tetra amino palladium nitrate

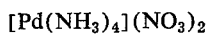

$$[Pd(NH_3)_4](NO_3)_2$$

and 18.05 grams of hydrated ferric nitrate,

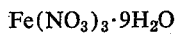

$$Fe(NO_3)_3 \cdot 9H_2O$$

The mineral, in lumpy powder form, was mixed with the aqueous solution to form a pasty mass. The pasty mass was dried in a vacuum at 200°–250° F. The resulting material was broken into small pieces, and then calcined. The calcined catalyst contained 0.5 weight percent palladium and 0.5 weight percent iron, in each case calculated as metal and based on the cracking component.

Example 7

A catalyst consisting of iron, palladium and an interstratified aluminosilicate (Catalyst D, a catalyst for use in the process of the present invention) was prepared exactly as in Example 6, except that the following starting materials were used:

(1) 500 grams of a synthetic interstratified smectite-illite synthetic crystalline aluminosilicate material as described in Granquist U.S. Pat. 3,252,757;

(2) 1250 ml. of an aqueous solution containing 4.24 grams palladium chloride (PdCl$_2$) and 12.2 grams of a hydrated ferric chloride (FeCl$_3 \cdot 6H_2O$). HCl in an amount of 14 ml. was added to dissolve the PdCl$_2$.

Example 8

A conventional catalyst consisting of silica-alumina and 6 weight percent nickel (Catalyst E, not a catalyst used in the process of the present invention) was prepared by impregnation of the silica-alumina with a nickel salt, followed by drying and calcining.

Example 9

A conventional catalyst consisting of approximately 58 weight percent silica, 30 weight percent alumina and 10 weight percent nickel (Catalyst F, not a catalyst used in the process of the present invention) was prepared by cogelation of precursors of all of the catalyst components, followed by drying and calcining.

Example 10

A conventional catalyst as in Example 9, except that it also contained tin as a hydrogenation component promoter (Catalyst G, not a catalyst for use in the process of the present invention) was prepared as in Example 9.

Example 11

Catalysts C, E, F and G of Examples 6, 8, 9 and 10, respectively, were separately used in unsulfided form to hydro-isomerize separate portions of a sulfur-free normal decane feedstock in separate runs. The isomerization conditions in each case, and the isomerization results obtained, were as follows:

| | Catalyst | | | |
|---|---|---|---|---|
| | C | E | F | G |
| (a) Temperature, °F | 510 | 550 | 510 | 510 |
| (b) Pressure, p.s.i.g | 1,200 | 1,200 | 1,200 | 1,200 |
| (c) Space velocity, v./v./hr | 1.0 | 1.0 | 1.0 | 1.0 |
| (d) Conversion to products other than normal decane, vol. percent | 73.5 | 15.0 | 18.0 | 3.9 |
| (e) Amount of isodecane in converted products, percent | 70.3 | 10.0 | 17.0 | 3.24 |
| (f) Selectivity for isodecane production, percent (100(e)/(d)) | 95.6 | 66.6 | 94.4 | 83.2 |

From this example, it may be seen that in the run using Catalyst C, a run according to the process of the present invention, the highest conversion to products other than normal decane was achieved, as well as the highest selectivity for the production of isodecane.

Example 12

Catalysts C, E, F and G of Examples 6, 8, 9 and 10, respectively, were sulfided in a conventional manner and then were separately used to hydroisomerize separate portions of a sulfur-containing normal decane feedstock, in separate runs. The isomerization conditions in each case, and the isomerization results obtained, were as follows:

| | Catalyst | | | |
|---|---|---|---|---|
| | C | E | F | G |
| (a) Temperature, °F | 510 | 550 | 510 | 510 |
| (b) Pressure, p.s.i.g | 1,200 | 1,200 | 1,200 | 1,200 |
| (c) Space velocity, v./v./hr | 1.0 | 1.0 | 1.0 | 1.0 |
| (d) Conversion to products other than normal decane, vol. percent | 31.4 | 80 | 94.5 | 41.1 |
| (e) Amount of isodecane in converted products, percent | 25.7 | 1.04 | 0.47 | 1.23 |
| (f) Selectivity for isodecane production, percent (100(e)/(d)) | 81.8 | 1.3 | 0.5 | 3.0 |

From this example it may be seen that in the run using Catalyst C, a run according to the process of the present invention, the highest selectivity for the production of isodecane was achieved, and that this selectivity was extremely high compared with that achieved in the comparison runs using Catalysts E, F and G.

Example 13

Catalysts C, E, F and G of Examples 6, 8, 9 and 10, respectively, were separately used in separate continuous runs to isomerize normal decane, with the sulfur content of the feed in each case being raised from zero micrograms of sulfur per gram of catalyst to 2000 micrograms of sulfur per gram of catalyst. The isomerization conditions in each case included a pressure of 1200 p.s.i.g., a space velocity of 1.0 v./v./hr., and a temperature of 510° F., except in the case of Catalyst E, with which a temperature of 550° F. was used. The isomerization results were:

| Sulfur in feed, micrograms per gram of catalyst | Isodecane in conversion product, weight percent | | | |
|---|---|---|---|---|
| | C | E | F | G |
| 0 | 70 | 10 | 33 | 3 |
| 100 | 43 | 7 | 26 | 3 |
| 200 | 30 | 6 | 16 | 3 |
| 400 | 25 | 5 | 3 | 2.5 |
| 1,000 | 25 | 4 | 0 | 2 |
| 2,000 | 25 | 3 | 0 | 1 |

From this example it may be seen that in the continuous run using Catalyst C, a run according to the process of the present invention, the isodecane in the conversion product at all sulfur levels was higher than in the cases of each of the comparison runs. Further, it may be seen that the continuous run using Catalyst C, a run in accordance with the present invention, was the only one in which the amount of isodecane in the conversion product leveled off after the feed sulfur content reached 400 micrograms per gram of catalyst, and did not continue to fall with further increases in sulfur level.

A catalyst consisting of palladium, chromium and an interstratified aluminosilicate (Catalyst H, a catalyst for use in the process of the present invention) was prepared generally as in Example 6, using a chromium compound instead of an iron compound. The calcined catalyst contained 0.5 weight percent palladium and 0.5 weight percent chromium, in each case calculated as metal and based on the cracking component.

Example 15

Catalyst H of Example 14 was used in unsulfided form to hydroisomerize a portion of a sulfur-free n-pentane feedstock. An additional portion of said feedstock was isomerized in a separate run with an unsulfided comparison catalyst, Catalyst I, a commercial pentane isomerization catalyst consisting of platinum metal on a fluorided alumina base. An additional portion of said feedstock was isomerized in a separate run with an unsulfided comparison catalyst, Catalyst J, consisting of 0.3 weight percent platinum and 4.7 weight percent fluoride on a silica-alumina base having a weight ratio of silica/alumina of 3/1.

The hydroisomerization conditions in each case, and the isomerization results obtained, were as follows:

|  | Catalyst | | |
| --- | --- | --- | --- |
|  | H | I | J |
| (a) Temperature, °F | 647 | 788 | 682 |
| (b) Presssure, p.s.i.g | 800 | 800 | 700 |
| (c) Space velocity, v./v./hr | 1.0 | 1.0 | 1.0 |
| (d) Conversion to isopentane, wt. percent | 50 | 50 | 50 |
| (e) Cracked products, wt. percent | 0.66 | 1.75 | |

From this example, it may be seen that in the run using Catalyst H, a run according to the process of the present invention, the indicated conversion to isopentane was achieved at the lowest operating temperature, and the highest selectivity for the production of isopentane was achieved.

What is claimed is:

1. A catalytic isomerization process which comprises contacting a hydrocarbon feedstock at catalytic isomerization conditions with a catalyst comprising a synthetic interstratified smectite-illite crystalline clay-type aluminosilicate component and at least one additional component comprising a metal.

2. A process as in claim 1, wherein said interstratified crystalline component contains 0–0.5 weight percent sodium and 0.0–3.0 weight percent fluorine, all on an anhydrous interstratified crystalline component basis.

3. A process as in claim 1, wherein said additional components is selected from the Group VIII metals and from the metals Ag, Cu, Sn, Ti, Zr, Th, Hf, Cr, Mo, W, V, Mn, alkaline earth metals Mg, Ca, Sr and Ba, rare earth metals having atomic numbers 57–71, and compounds of the foregoing metals.

4. A process as in claim 1, wherein said catalyst comprises said interstratified crystalline aluminosilicate component in particulate form dispersed in a matrix comprising an amorphous gel and said additional component.

5. A process as in claim 4, wherein said interstratified crystalline aluminosilicate component is substantially in the ammonium or hydrogen form, and further is substantially free of any catalytic loading metal or metals.

6. A process as in claim 1, wherein said hydrocarbon feedstock consists of or contains substantial amounts of at least one compound selected from aromatic, olefin, cycloparaffin, isoparaffin and normal paraffin compounds.

7. A process as in claim 1, wherein said hydrocarbon feedstock consists of or contains substantial amounts of an aromatic compound.

8. A process as in claim 6, wherein said feedstock consists of or contains substantial amounts of a normal paraffin compound.

9. (A process as in claim 6, wherein said feedstock is a hydrocarbon distillate containing normal paraffins and isoparaffins in a ratio of normal paraffins to isoparaffins that differs from the equilibrium ratio at the catalytic isomerization conditions used.

10. A process as in claim 1, wherein said catalytic isomerization conditions include a temperature in the range 300° to 950° F., a pressure in the range 0 to 3000 p.s.i.g., a liquid hourly space velocity in the range 0.5 to 20, and a total hydrogen supply rate of 200 to 20,000 standard cubic feet of hydrogen per barrel of hydrocarbon feedstock.

References Cited

Grim, Clay Minerology, 2nd ed., McGraw-Hill, New York (1968), pp. 77–99 and 121.

McEwan et al., The X-Ray Identification Crystal Structures of Clay Materials, Minerological Soc., London (1961), pp. 393–445.

CURTIS R. DAVIS, Primary Examiner

U.S. Cl. X.R.

208—DIG. 2; 260—683.2, 683.65

PO-1050
(5/69)

UNITED STATES PATENT OFFICE
CERTIFICATE OF CORRECTION

Patent No. 3,655,798         Dated April 11, 1972

Inventor(s) SIGMUND M. CSICSERY and BERNARD F. MULASKEY

It is certified that error appears in the above-identified patent and that said Letters Patent are hereby corrected as shown below:

Column 4, line 19, "cycloparaffins, with minimum cracking" should read --cycloparaffins and normal paraffins, with minimum cracking--

Column 10, line 30, "15 to 15 p.s.i.g." should read --15 to 1500 p.s.i.g.--

Column 15, after line 4 and before line 5, please insert --Example 14--.

Signed and sealed this 5th day of December 1972.

(SEAL)
Attest:

EDWARD M. FLETCHER, JR.
Attesting Officer

ROBERT GOTTSCHALK
Commissioner of Patents